United States Patent
Elsayed et al.

(10) Patent No.: US 10,085,275 B2
(45) Date of Patent: Sep. 25, 2018

(54) SYNCHRONIZATION AND INTERPROCESSOR COMMUNICATION IN A LOW POWER LTE SYSTEM ARCHITECTURE

(71) Applicant: Apple Inc., Cupertino, CA (US)

(72) Inventors: Moustafa M. Elsayed, Los Gatos, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 15/260,349

(22) Filed: Sep. 9, 2016

(65) Prior Publication Data
US 2017/0265211 A1      Sep. 14, 2017

Related U.S. Application Data

(60) Provisional application No. 62/307,675, filed on Mar. 14, 2016.

(51) Int. Cl.
*H04W 72/12* (2009.01)
*H04L 12/861* (2013.01)
*H04W 84/04* (2009.01)

(52) U.S. Cl.
CPC ......... *H04W 72/1205* (2013.01); *H04L 49/90* (2013.01); *H04W 72/1289* (2013.01); *H04W 84/042* (2013.01)

(58) Field of Classification Search
CPC .............................. H04W 52/02; H04W 72/04
See application file for complete search history.

(56) References Cited

U.S. PATENT DOCUMENTS 7,305,259 B1   12/2007   Malone
9,504,059 B2   11/2016   Belghoul et al.
(Continued)

FOREIGN PATENT DOCUMENTS

EP    2 903 354 A1    8/2015

OTHER PUBLICATIONS

Kini, Ananth V., et al.; "A Dynamic Subframe Set Power Control Scheme for Interference Mitigation in Reconfigurable TD-LTE Systems"; 23rd Wireless and Optical Communication Conference (WOCC); May 9-10, 2014; 6 pages.
(Continued)

*Primary Examiner* — Lakeram Jangbahadur
(74) *Attorney, Agent, or Firm* — Meyertons Hood Kivlin Kowert & Goetzel, P.C.; Jeffrey C. Hood; Joel L. Stevens

(57) ABSTRACT

This disclosure relates to synchronization and interprocessor communication techniques in an improved system architecture for a cellular modem. According to some embodiments, a wireless device may include a control module, a downlink module, and an uplink module. The control module may decode control information to determine whether uplink or downlink activities are scheduled. If any uplink or downlink activities are scheduled, the control module may activate one or both of the uplink module or the downlink module to perform the scheduled activities. If no downlink activities are scheduled, the downlink module may not be activated by the control module, and may remain asleep until a later time when downlink activities are scheduled. Likewise, if no uplink activities are scheduled, the uplink module may not be activated by the control module, and may remain asleep until a later time when uplink activities are scheduled.

20 Claims, 12 Drawing Sheets

(56) References Cited

U.S. PATENT DOCUMENTS

| | | |
|---|---|---|
| 2005/0105369 A1 | 5/2005 | Schoenfeld |
| 2005/0118981 A1 | 6/2005 | Laroia et al. |
| 2006/0187862 A1 | 8/2006 | Lee et al. |
| 2008/0310485 A1 | 12/2008 | Soliman |
| 2009/0253448 A1 | 10/2009 | Kwon |
| 2009/0290561 A1 | 11/2009 | Kleindl |
| 2010/0136928 A1* | 6/2010 | Rofougaran ...... H04W 52/0245 455/90.2 |
| 2011/0003609 A1 | 1/2011 | Sundstrom et al. |
| 2011/0280133 A1* | 11/2011 | Chang ................ H04L 1/0052 370/241 |
| 2013/0040666 A1 | 2/2013 | Chin et al. |
| 2013/0157590 A1 | 6/2013 | Mo |
| 2013/0242818 A1 | 9/2013 | Heo |
| 2014/0153460 A1 | 6/2014 | Shrivastava |
| 2014/0362728 A1 | 12/2014 | Krochmal et al. |
| 2014/0364118 A1 | 12/2014 | Belghoul et al. |
| 2015/0011157 A1 | 1/2015 | Terry |
| 2015/0092645 A1* | 4/2015 | Tabet .................... H04L 1/1825 370/311 |
| 2015/0271769 A1 | 9/2015 | Bharadwaj |
| 2015/0282045 A1 | 10/2015 | Salem |
| 2016/0197736 A1 | 7/2016 | Shvarzberg |
| 2016/0234718 A1 | 8/2016 | Thangarasa et al. |
| 2016/0270118 A1 | 9/2016 | He |
| 2016/0294942 A1 | 10/2016 | Tembey |
| 2016/0295637 A1 | 10/2016 | Bergquist et al. |
| 2017/0013630 A1* | 1/2017 | Franz ........................ H04L 5/00 |

OTHER PUBLICATIONS

International Search Report and Written Opinion, Application No. PCT/US2017/013668, dated Apr. 6, 2017, 13 pages.

* cited by examiner

SYNCHRONIZATION AND INTERPROCESSOR COMMUNICATION IN A LOW POWER LTE SYSTEM ARCHITECTURE

PRIORITY INFORMATION

This application claims priority to U.S. provisional patent application Ser. No. 62/307,675, entitled "Synchronization and Interprocessor Communication in a Low Power LTE System Architecture," filed Mar. 14, 2016, which is hereby incorporated by reference in its entirety as though fully and completely set forth herein.

TECHNICAL FIELD

The present application relates to wireless communication, including to synchronization and interprocessor communication techniques in an improved system architecture for a low rate low power LTE modem.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices. Therefore, improvements in the field are desired.

SUMMARY

Embodiments are presented herein of, inter alia, systems, apparatuses, and methods for synchronization and interprocessor communication in a low power wireless communication system architecture.

According to the techniques described herein, a wireless device may utilize a cellular modem architecture including a control module, a downlink module, and an uplink module. The control module may include a processor core and hardware subsystem that handles control communications according to a cellular communication technology. Likewise, the downlink module may include a processor core and hardware subsystem that handles downlink data communications according to the cellular communication technology, while the uplink module may include a processor core and hardware subsystem that handles uplink communications according to the cellular communication technology. Each module may be wholly responsible for its respective domain and may be powered up or down without affecting operation of the other modules.

Such an architecture may allow for efficient operation, as modules that are not needed at a particular time may be powered off or may enter a sleep mode with reduced power usage, and only powered when needed. However, separating control, uplink, and downlink operations in such a manner may require careful consideration as to how to effectively and efficiently provide for intermodule synchronization and communication.

As one possibility, the control module may be responsible for providing synchronization between the modules. For example, at the beginning of each subframe according to the cellular communication technology, an interrupt may be raised (e.g., according to a timer) at the control module to ensure that the control module remains synchronized with its serving base station according to the cellular communication technology. The control module may receive and decode any control information provided by the base station in that subframe. The control module may determine whether the control information schedules any downlink operations, and also whether the control information schedules any uplink operations, for the wireless device.

If any downlink operations are scheduled, the control module may provide an interrupt to the downlink module at a time appropriate for the scheduled downlink operations, for example at the beginning of the subframe in which the downlink operations are scheduled, as one possibility. Similarly, if any uplink operations are scheduled, the control module may provide an interrupt to the uplink module at a time appropriate for the scheduled uplink operations, for example several OFDM symbols prior to the beginning of the subframe in which the uplink operation(s) are scheduled (e.g., to provide sufficient time to prepare for the uplink operation(s)).

If there is no control information in a given subframe, or the control information does not schedule any downlink operations, the control module may allow the downlink module to enter or remain in its sleep mode. Similarly, if there is no control information in a given subframe, or the control information does not schedule any uplink operations, the control module may allow the uplink module to remain in its sleep mode. Since the downlink module and the uplink module may be capable of operating independently of each other, in some instances it may be possible for the uplink module to be activated while the downlink module remains asleep, or vice versa.

Additionally, according to some embodiments, blocking first in first out (FIFO) buffers may be used to facilitate communication between the modules. For example, a unidirectional blocking FIFO may be provided for each of communication from the control module to the downlink module and vice versa, and from the control module to the uplink module and vice versa. Communication between the downlink module and the uplink module may be provided by way of the control module or additional unidirectional blocking FIFOs may be provided for each of communication from the downlink module to the uplink module and vice versa, as desired. This may allow for confirmations to be provided between the modules, effectively providing a feedback path that may help with predicting bugs and exception handling.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
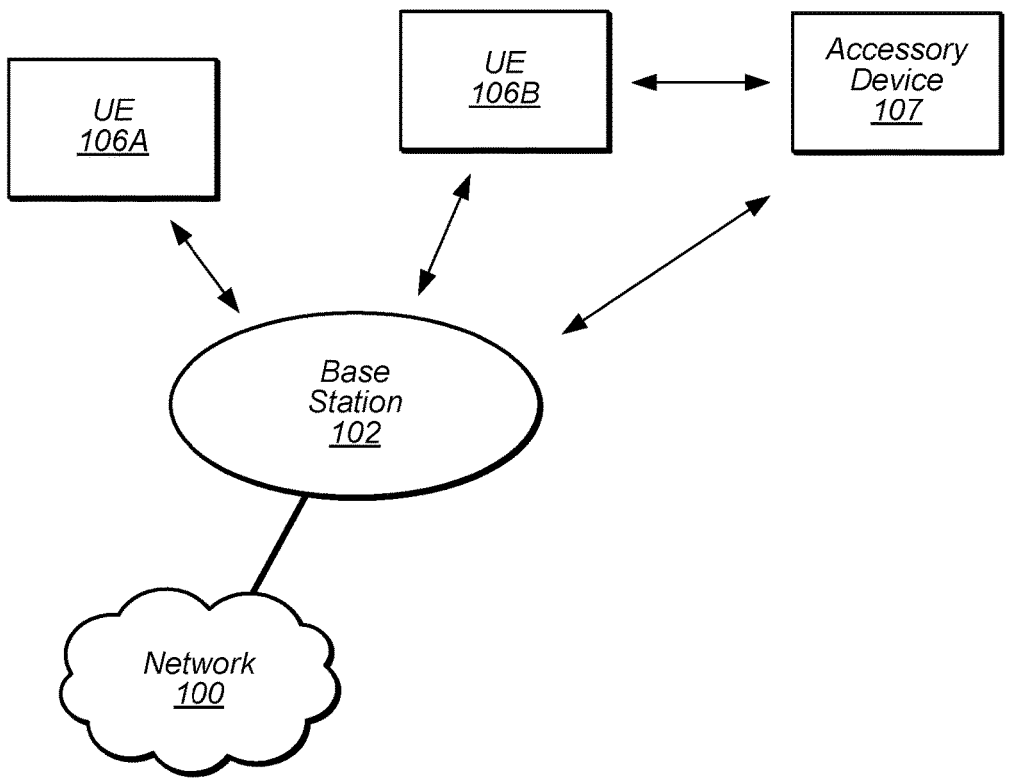
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Glossary

The following acronyms are used in this disclosure:
PUCCH: Physical Uplink Control Channel
PUSCH: Physical Uplink Shared Channel
PRACH: Physical Random Access Channel
PDCCH: Physical Downlink Control Channel
PDSCH: Physical Downlink Shared Channel
EPDCCH: Enhanced Physical Downlink Control Channel
PCFICH: Physical Control Format Indicator Channel
PHICH: Physical Hybrid-ARQ Indicator Channel
PBCH: Physical Broadcast Channel
PSS: Primary Synchronization Signals
SSS: Secondary Synchronization Signals
UL: Uplink
DL: Downlink
ULM: Uplink Manager
DLM: Downlink Manager
HARQ: Hybrid Automatic Repeat Request
HW: Hardware
TTI: Transmit Time Interval Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device, or any type of communication device. The wireless embodiment described below is one example embodiment.

As shown, the exemplary wireless communication system includes a cellular base station 102A, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

Figure 2:
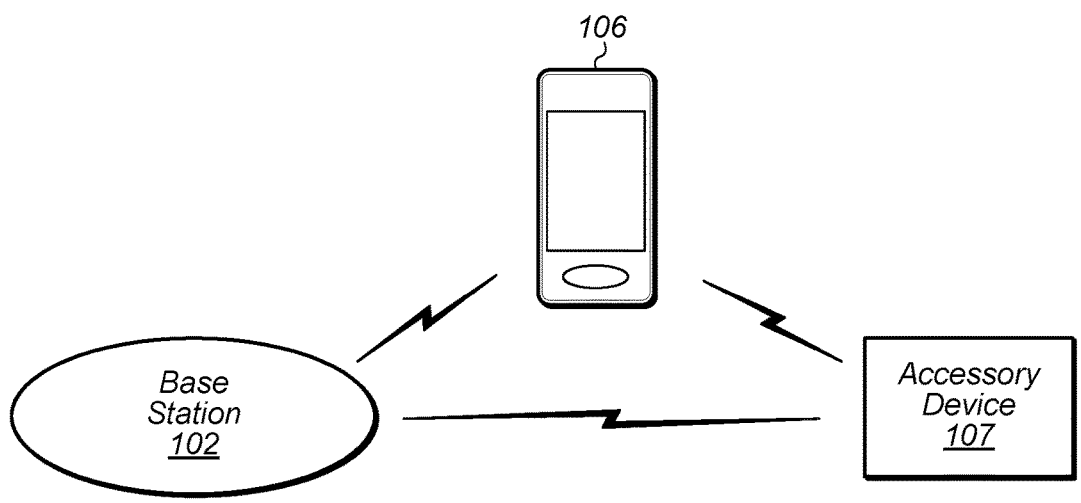
FIG. 2 illustrates an example system where an accessory device can selectively either directly communicate with a cellular base station or utilize the cellular capabilities of an intermediate or proxy device such as a smart phone, according to some embodiments.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol, and may then use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of handheld device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
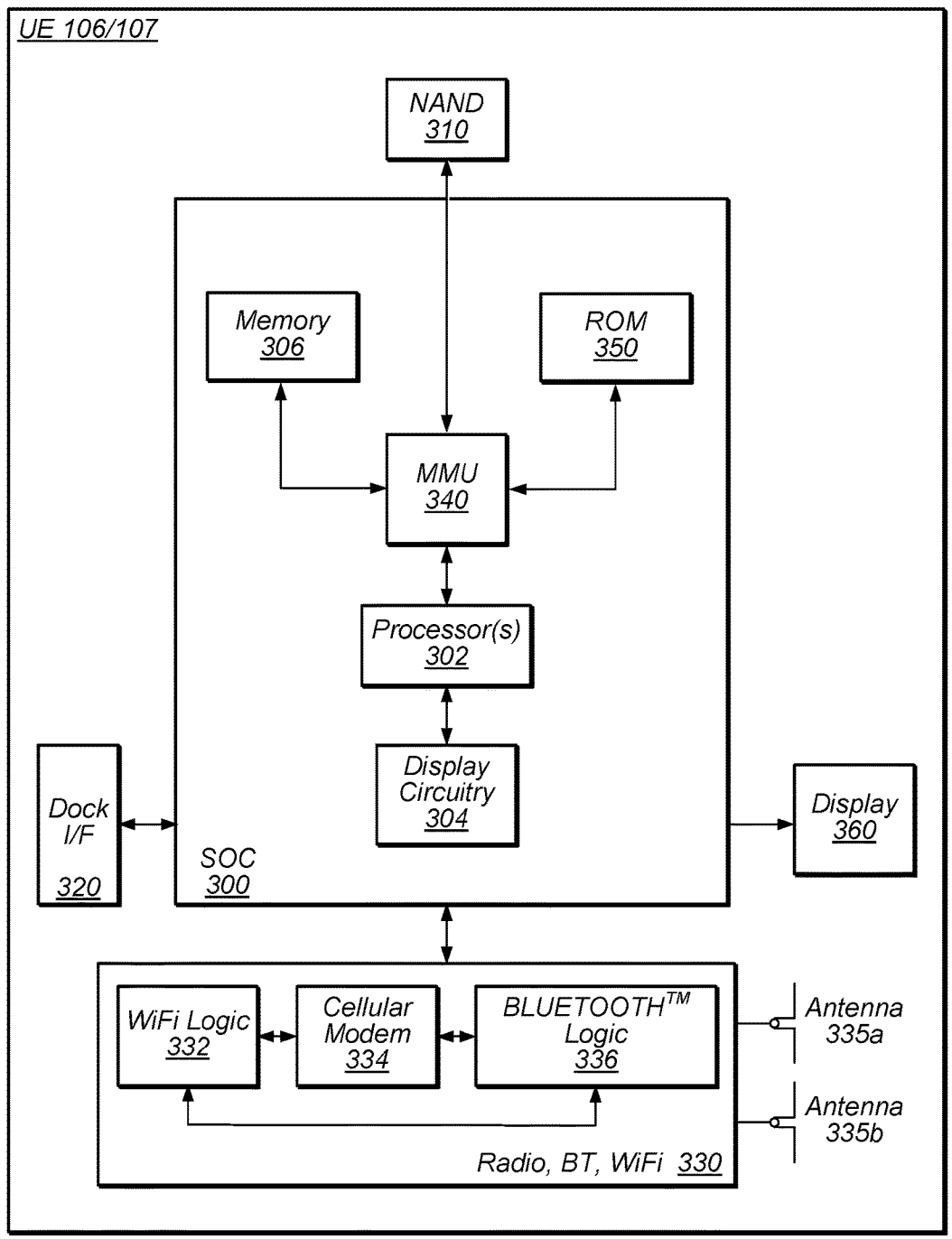
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

The UE device 106/107 may also include other circuits or devices, such as the display circuitry 304, radio 330, connector I/F 320, and/or display 360.

In the embodiment shown, ROM 350 may include a bootloader, which may be executed by the processor(s) 302 during boot up or initialization. As also shown, the SOC 300 may be coupled to various other circuits of the UE device 106/107. For example, the UE device 106/107 may include various types of memory, a connector interface 320 (e.g., for coupling to a computer system), the display 360, and wireless communication circuitry 330 (e.g., for communication using LTE, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem having a system architecture as described herein, and as shown by at least FIGS. 7-8.

As described herein, the cellular modem 334 may include hardware and software components for implementing embodiments of this disclosure. The cellular modem 334 of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Cellular Modem for Low Rate/Low Power Devices

As noted above, certain devices may have one or more of reduced size, reduced battery capability, or reduced power capability relative to other types of devices. Cellular modem chips that are marketed and sold today are designed for high data rates and high performance. As a result, the power consumption of current cellular modem chips is generally suboptimal for low power applications. Accordingly, there is a need for a low power cellular modem, such as an LTE modem, that is capable of operating at low transfer rates. There is also a need for a cellular modem for normal (high data rate) applications that consumes less power than current prior art devices.

Cellular activities can be thought of as semi-orthogonal, meaning that uplink activities do not necessarily depend on downlink activities, and vice versa. However, a type of feedback exists between the uplink and downlink to reduce errors during reception and transmission. For example, a UE may generate channel quality information (CQI) based on received downlink transmissions and transmit this CQI information in the uplink to the base station for use in adjusting future downlink transmissions.

Many cellular systems, such as LTE systems, utilize different aspects of the system at different time intervals. In other words, downlink and uplink operations are not required to be active all of the time, but rather are in use sometimes and not in use other times. Some communication scenarios utilize only some part of the downlink and nothing from the uplink. This behavior may occur, e.g., when the UE supports half duplex mode.

Cellular (e.g., LTE) modem resources (memory, buses, processors, I/O-interfaces, etc.) are mapped or assigned to the performance of different cellular (LTE) tasks. Some cellular (LTE) scenarios (paging, airplane mode, data transfer, etc.) can be served by a subset of the resources. In this instance, it would be desirable for the unused resources to enter a low power state (e.g., off, less clocking, less voltage, etc.). Therefore, an improved cellular modem system architecture is desired which is able to opportunistically take advantage of scenarios when unused resources are able to be placed in a low power mode.

Figure 4:
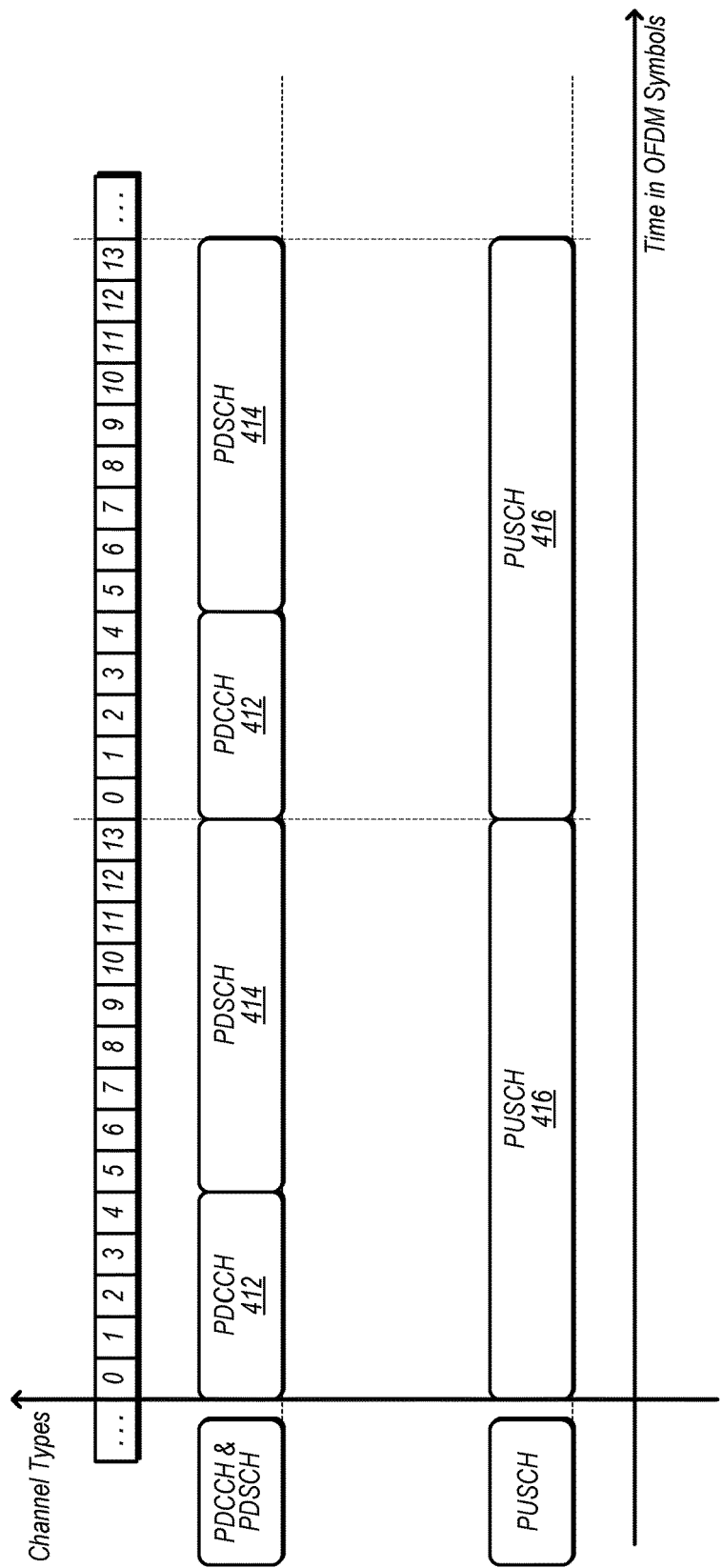
FIG. 4 illustrates an example of downlink and uplink channels that can be provided according to a cellular communication technology, according to some embodiments.

FIG. 4—Subframe Structure

FIG. 4 illustrates an example subframe structure, including typical downlink and uplink channels provided during the exemplary subframe, according to a cellular communication technology such as LTE.

As shown, each subframe may include one transmission time interval (TTI) that may have a duration of 1 ms, and may include 14 OFDM symbols.

The first 3 OFDM symbols of each TTI may include the PDCCH 412, in which the any DL/UL configuration/assignment information is sent. Thus, a wireless device may decode the PDCCH 412 and use the information obtained therefrom to configure PDSCH 414 reception and PUSCH 416 transmission activities.

The PDSCH 414 may be transmitted over the remaining 11 OFDM symbols of each TTI (and in some instances possibly also using some resource elements of the first 3 OFDM symbols of a TTI). Downlink data (e.g., application data) for wireless devices served by a base station may be provided on the PDSCH 414.

As shown, parallel to the DL is the physical uplink channel PUSCH 416. The PUSCH 416 may be transmitted over the whole TTI. Uplink data (e.g., application data) from wireless devices served by a base station may be provided on the PUSCH 416.

Figure 5:
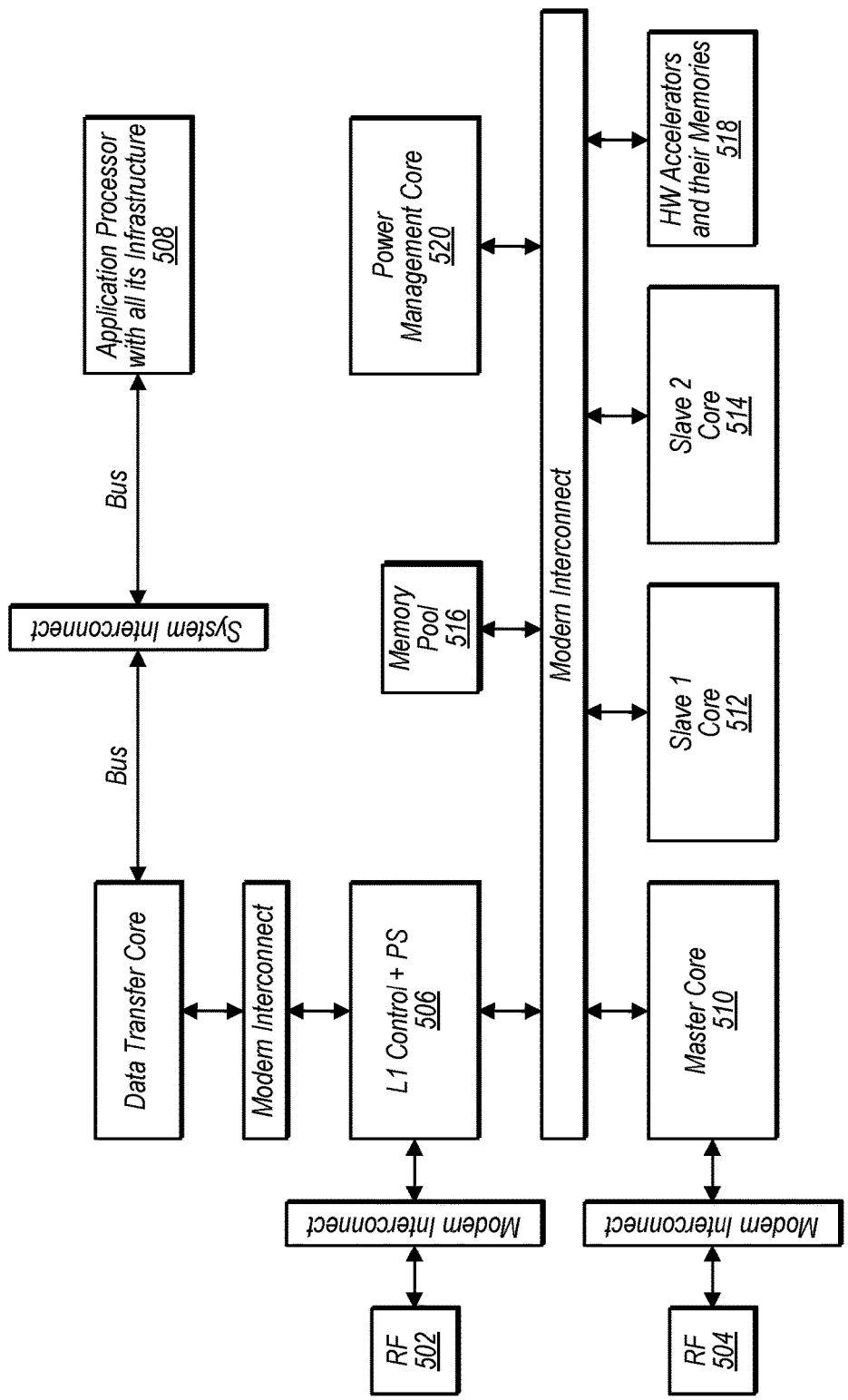
FIG. 5 illustrates a system architecture according to the prior art.

FIG. 5—Prior Art Cellular Modem Architecture

FIG. 5 illustrates an architecture of a cellular modem in the prior art. As shown, this example prior art architecture includes first radio frequency (RF) circuitry 502 and second RF circuitry 504. The first RF circuitry 502 couples to an L1 Control Core 506, where L1 refers to the Physical Layer. The L1 Control Core 506 performs lower Layer 1 control. The L1 Control Core 506 may include protocol stack (PS) software or may couple to a PS (Protocol Stack) Core. The L1 Control Core (or Protocol Stack Core) 506 may couple through a bus to the Application Processor 508. The second RF circuitry 504 couples to a Master Core 510. The Master Core 510 also performs lower Layer 1 control and may be implemented in firmware. The architecture may also include a Slave 1 Core 512, which performs lower Layer 1 control, and a Slave 2 Core 514, which performs upper Layer 1 control. The architecture may further include one or more memory pools 516, hardware accelerators 518 and/or a power management core 520.

The L1 Control Core 506 performs various tasks, such as: dispatching higher layer messages to the corresponding modules/threads; managing/configuring all physical channels including uplink/downlink channels and control/data channels; scheduling measurements and RF activities; performing conflict resolution; and power saving. The L1 Control Core 506 has two states, these being "On" and "LowPowerState", and its duty cycle is such that it is in an "On" state 95% of the time. The L1 Control Core 506 is in the "LowPowerState" in DRX mode.

The Master Core 510 performs various tasks, such as: dispatching L1 Control layer messages to the corresponding modules/threads; managing/configuring the hardware components of the physical channels including uplink/downlink channels and control/data channels; scheduling measurements and RF activities; scheduling/assigning tasks lists to all each of the three Cores; reporting results to the L1 Control Core 506; resolving conflicts when using shared resources; managing power gating/DVFS for all Lower Layer 1 Control and HW-modules. The Master Core 510 has two states, these being "On" and "LowPowerState", and its duty cycle is generally in an "On" state 95% of the time. The FW Master Core 510 is in the "LowPowerState" in DRX mode.

The Slave 1 Core 512 and Slave 2 Core 514 perform various tasks, such as configuring/controlling hardware components according to the dispatched task list and delivering results to the Master Core 510. For each of the Slave Cores 512, 514, the task list is the only input and the results of the individual tasks are the only output. The Slave Cores 512, 514 also have the ability to access hardware components present in the system. The Slave 1 and 2 Cores 512, 514 each have two states, these being "On" and "LowPowerState", and they are in the "On" state during task list execution. The Slave Cores 512, 514 are in the "LowPowerState" when doing nothing.

The Memory Pool(s) 516 are shared among the cores and may contain various buffers, such as a MAC-DL-FiFO, a –MAC-UL-FIFO, an Interprocess Shared Memory, and Housekeeping memory for scheduling, conflict handling, threads data, etc.

The "L1 Control Core" 506 and "Master Core" 510 are configured for bidirectional communication all of the time. Neither of these two cores with all their associated system resources can be switched off at any time. These two cores spend a great deal of their time dealing with scheduling, conflict handling, resource management and housekeeping for their threads/tasks interactions. This leads to latency in executing power saving modes and causes the system to be less responsive to LTE-air-interface activities (requests must propagate through three layers of software down to the hardware which serves the air interface)

Figure 6:
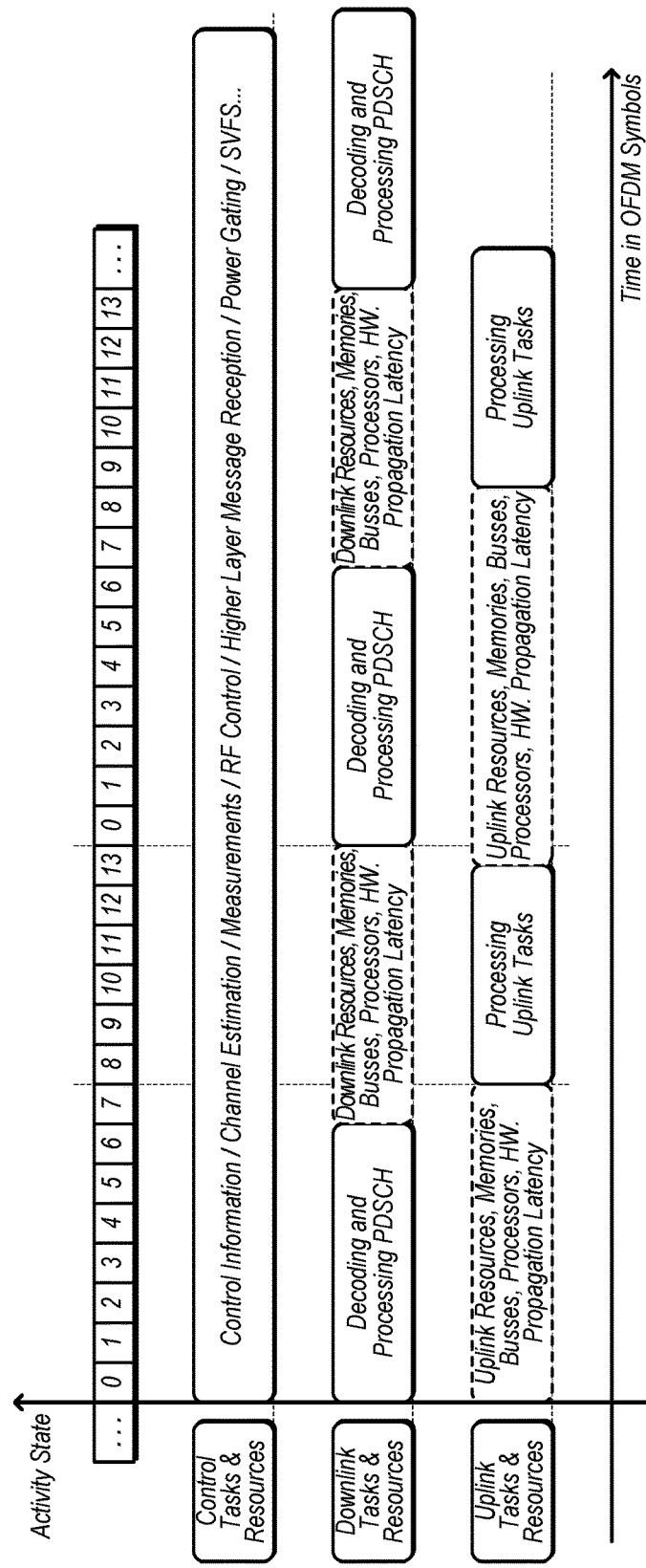
FIG. 6 illustrates the utilization of control, downlink and uplink resources of the prior art system architecture of FIG. 5, where the shaded boxes indicate wasted resource usage.

For any cellular (e.g., LTE) activity, the two Slave Cores 512, 514 are used to dispatch tasks to the hardware. These two cores cannot decide whether or not they should be in an off state. As a result, they spend the most of their life cycles in a "waiting for action" state, executing wait cycles. The memory pools (for hardware Processors) are also in an "on" ("non-off") state all of the time. The hardware path is also active during any kind of LTE activity in the air interface FIG. 6—Example Use Case of Prior Art Cellular Modem Architecture FIG. 6 illustrates an example use case for the prior art cellular modem architecture shown in FIG. 5. In the use case shown in FIG. 6, the control, downlink and uplink (CTRL, DL, UL) channels are all active. The boxes with dashed lines represent operation of the respective logic after processing, wherein the resources are unused but remain active. All of the resources ranging from the higher software layers to the hardware (all system resources) are active whether or not the downlink/uplink is in a processing state. The boxes with dashed lines also include the time wasted in issuing requests from an upper software layer/lower software layer and delivering results to the lower software layer/upper software layer synchronized at time interval boundaries. Thus, in the timeline of FIG. 6 the boxes with dashed lines indicate waste of resource usage, resulting in unnecessary power consumption and reduced battery life.

Figure 7:
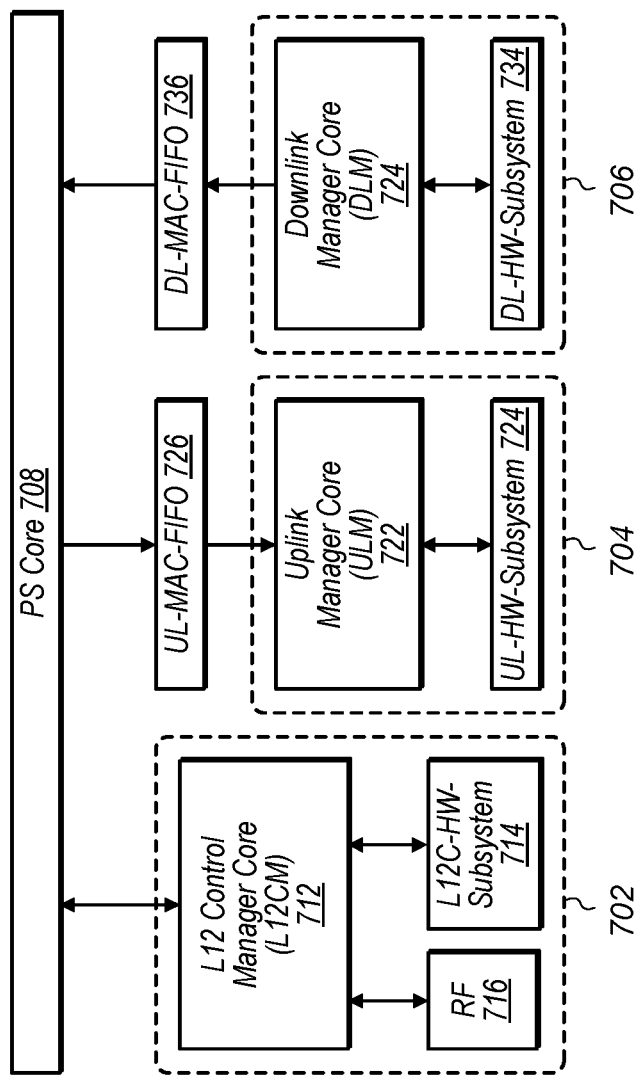
FIG. 7 is a block diagram illustrating an improved system architecture for a low power wireless device, according to some embodiments.

FIG. 7—Low Power Cellular Modem Architecture

FIG. 7 illustrates a low power cellular modem architecture, according to some embodiments. As shown, the modem is divided into three orthogonal domains or modules, these being a control module (control manager module) 702, an uplink module (uplink manager module) 704, and a downlink module (downlink manager module) 706. Each of these modules is delineated by dashed lines. The control module may comprise a control core, referred to as the L12 Control Manager Core (L12CM) 712 and associated controller hardware subsystem (L12C-HW-Subsystem) 714. The uplink manager module may comprise an Uplink Manager Core (ULM) 722 and associated uplink hardware subsystem (UL-HW-Subsystem) 724. The downlink manager module may comprise a Downlink Manager Core (DLM) 732, also referred to as the PDSCH (Physical Downlink Shared Channel) Manager Core, and associated downlink hardware subsystem (DL-HW-Subsystem) 734. The term "Module" as used herein refers to a collection of one or more processor elements, hardware components, etc. The term "Core" as used herein refers to a "Processing Element" or "Processor" as defined here.

The L12 Control Manager Core (L12CM) is coupled to RF circuitry 716. The RF circuitry 716 is configured for performing RF communications. The controller module (including the L12CM) 702 may couple to a Protocol Stack (PS) Core 708. The uplink manager module 704 may couple through an Uplink Mac FIFO buffer (UL-MAC-FIFO) 726 to the PS Core 708. The downlink manager module 706 may couple through a Downlink Mac FIFO buffer (DL-MAC-FIFO) 736 to the PS Core 708.

Figure 8:
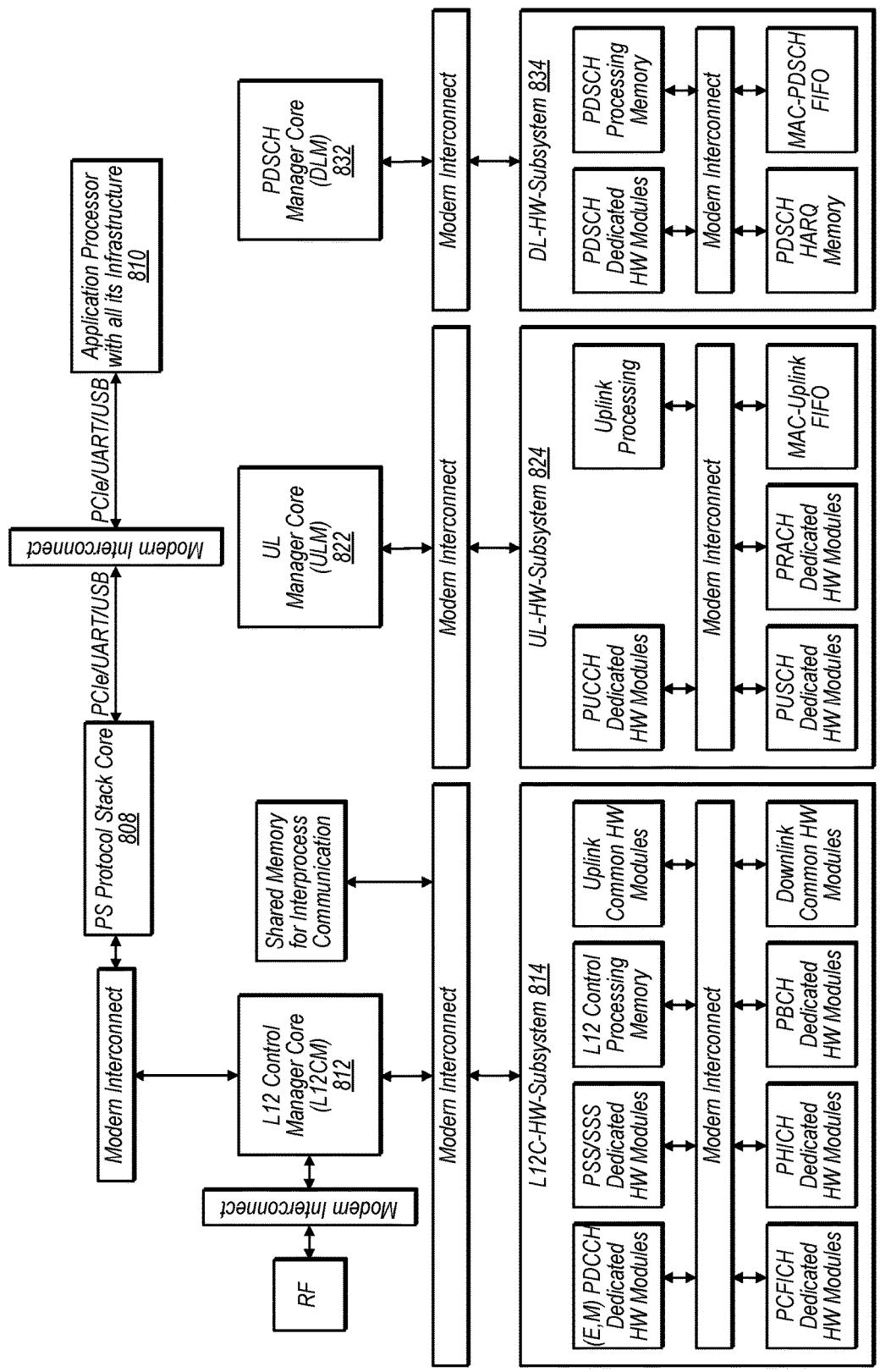
FIG. 8 is a more detailed block diagram illustrating an improved system architecture for a low power wireless device, according to some embodiments.

FIG. 8—Low Power Cellular Modem Architecture

FIG. 8 illustrates a more detailed block diagram of the low power cellular modem architecture of FIG. 7, according to some embodiments. As shown and as discussed above, the modem is divided into three orthogonal domains, these being a control module, an uplink module, and a downlink module. The control module comprises a controller core 812, also referred to as the L12 Control Manager Core (L12CM) 812, and associated controller hardware subsystem (L12C-HW-Subsystem) 814. The uplink manager module comprises an Uplink Manager Core (ULM) 822 and associated uplink hardware subsystem (UL-HW-Subsystem) 824. The downlink manager module comprises a Downlink Manager Core 832, also referred to as the PDSCH (Physical Downlink Shared Channel) Manager Core 832, and associated downlink hardware subsystem (DL-HW-Subsystem) 834. The L12 Control Manager Core (L12CM) 812 is coupled to the RF circuitry 816. The L12 Control Manager Core (L12CM) 812 is also coupled through a PS Protocol Stack Core 808 to the Application Processor and its associated infrastructure 810.

FIG. 8 shows one example embodiment where each module or domain has a single core and an associated hardware subsystem. However, it is noted that one or more of the modules may have a plurality of cores and/or a plurality of associated hardware subsystems. For example, in some embodiments the uplink module may have a plurality of UL Manager Cores (ULMs) and/or a plurality of UL-HW-Subsystems. As another example, in some embodiments the downlink module may have a plurality of DL Manager Cores (DLMs) (also referred to as PDSCH Manager Cores) and/or a plurality of DL-HW-Subsystems. These additional cores/hardware subsystems may be included when a cellular modem with this system architecture is used in a more traditional platform such as a smart phone or tablet, e.g., where low power is not as much a requirement but is still a desirable feature, and high data rates and more advanced features, such as carrier aggregation, are desired.

The L12C-HW-Subsystem 814 may comprise a plurality of hardware components, such as (E,M) PDCCH dedicated hardware modules, PSS/SSS dedicated hardware modules, L12 Control Processing Memory, Uplink Common hardware modules, PCFICH dedicated hardware modules, PHICH dedicated hardware modules, PBCH dedicated hardware modules, and downlink common hardware modules, among possible others.

The UL-HW-Subsystem 824 may comprise PUCCH dedicated hardware modules, an uplink processing module, PUSCH dedicated hardware modules, PRACH dedicated hardware modules, and a MAC-uplink FIFO.

The DL-HW-Subsystem 834 may comprise PDSCH dedicated hardware modules, PDSCH processing memory, PDSCH HARQ memory, and a MAC-PDSCH FIFO.

Each of these three orthogonal domains may comprise a dedicated set of all of the resources (memory, processors, busses, hardware, etc.) that it needs, and these dedicated resources for a particular domain are not shared with other domains. If one core is switched off, then consequently all that core's resources in its own domain will be switched off as well.

Each module (or each core) may have its own control/configuration software. Each core (processing element) may independently schedule the tasks for the domain's lower level components. The tasks may be scheduled in a hierarchical manner, much like a tree structure with one root and one level of branches. The architecture shown in FIG. 8 has no need for the components as in the other two architectures. As noted above, the three modules are orthogonal, with one aspect of this orthogonality being that each module can be powered off independently of the other modules.

The LTE-air-interface schedules sequential/parallel control/configuration information for receiving/transmitting DL/UL data. The control module (L12CM) controls the lifecycle of the DLM and ULM modules. The control module (L12CM) wakes up the DLM and ULM module and delivers configuration data to them only if their existence is needed, otherwise they will be powered off.

In at least some embodiments, the system of FIG. 8 has no need for, and does not contain, a real time operating system (RTOS) with its overhead and context switching. Each core has a dedicated task, e.g., a control core which performs control tasks, an uplink core which performs uplink tasks, and a downlink core which performs downlink tasks. These separate, dedicated orthogonal cores produce the desired parallelism for dealing with UL/DL/Control operations, and hence there is no need for a RTOS.

In at least some embodiments, no resource sharing is performed among the three modules or domains. In other words, each module or domain is orthogonal to the other domains with respect to its resources. The common resources belong to L12CM which prepares everything for the other two domains (the UL and DL domains).

L12 Control Manager Core/Module

The L12 Control Manager Core may perform various tasks such as: handling/dispatching of higher layer messages; controlling/configuring L12 downlink control channels (E,M)DPCCH, PCFICH, and PHICH; controlling/configuring common data path hardware components; configuring/controlling PSS/SSS/PBCH; performing measurements; performing channel estimation/loops; managing the L12 Control-HW-Subsystem resources and power gating; and controlling the RF hardware. The L12 Control Manager Core has three states, these being On, Off, and Low Power (LP). The L12 Control Manager Core is in the On state during all LTE scenarios, except when LTE is in IDLE mode, where the L12 Control Manager Core is in the LP state. The L12 Control Manager Core is in the Off state only when performing a "cold" start. Each of these tasks is discussed in greater detail below.

The L12 Control Manager Core may perform handling and dispatching of higher layer (RRC or MAC) messages using flat control code, i.e., control code without any hierarchical layers. The L12 Control Manager Core may process all the messages in one single domain (module) and then dispatch the modified versions of the messages to their final destination domains (modules). There may be only one receiver per message, and this receiver may not share any information of the message with the other modules. The L12 Control Manager Core may not perform state sharing, which entails that no global scheduling is required, and also no global resource management is required. Since there is no low level coordination among different modules, power saving decisions are local to every domain (or module).

The L12 Control Manager Core may perform receiving/processing of the following channels: (E,M)PDCCH, PCFICH, PHICH. The L12 Control Manager Core may configure its L12CM-HW-Subsystem to receive L1/L2 downlink common control channels. The control information may be dispatched to the ULM or/and DLM cores only if required.

The L12 Control Manager Core may control/configure the common parts of the uplink and the downlink. For different physical channels, the common parts may be configured and controlled by L12CM without waking up any of the other two cores ULM/DLM with their respective HW domains. The common parts might be for example scrambling, certain aspects of rate matching, etc.

The L12 Control Manager Core may control the timing of waking up the ULM and DLM cores. Upon reception of any scheduling assignment for DL, the L12 Control Manager Core buffers the DL-configuration for the DLM core and then wakes up the DLM core directly and preferably immediately prior to DL processing. Similarly, if the L12 Control Manager Core receives uplink scheduling grants, it buffers the configuration for the ULM core and it wakes up the ULM core directly and preferably immediately prior to processing the transport block for UL transmission.

The L12 Control Manager Core may perform common signal processing, such as channel estimation, automatic gain control (AGC), TTL, FTL, Loops and measurements.

The L12 Control Manager Core may operate to configure/control the RF hardware. The L12 Control Manager Core may be the only core to configure and control the RF, and may have a single module to perform this task. In some embodiments, switching on/off the RF hardware is done locally by the L12 Control Manager Core. Thus the power saving modes can be applied dependent on the particular scenario. Making RF decisions locally leads to fast application of those decisions without requiring coordination with any other modules.

The L12 Control Manager Core may perform power gating of the L12C-HW-Subsystem. In other words, the L12 Control Manager Core may have the ability to turn on/off individual hardware components of the L12C-HW-Subsystem. If the L12CM core sees, according to its sole scheduling, that any module of HW module of L12C-HW-Subsystem is not needed, it switches this hardware module off.

The L12 Control Manager Core may operate to configure/operate PSS/SSS/PBCH. It processes PSS/SSS/PBCH without the need to wake up any of the other two cores with their respective domains.

The L12 Control Manager Core may have only one layer of software inside. Accordingly, there is only one entity (L12Control) which decides/requests/executes/evaluates the various operations performed in the core. The core thus also has no latency with respect to its associated HW-Subsystem. Since the L12 Control Manager Core implements a flat software system (software without hierarchical layers), power saving decisions are relatively easy, and no interaction among different entities is needed to decide whether a resource needs to be off, on, or in low power mode.

UL Manager Core (ULM) Domain

The UL Manager Core (ULM) performs various tasks such as: scheduling for uplink activities; controlling/configuring uplink physical channels PUCCH, PUSCH, and PRACH; controlling/configuring uplink dedicated data path; managing UL-HW-Subsystem resources and power gating; and managing the MAC uplink buffer. The UL Manager Core (ULM) has two states, these being On and Off. The UL Manager Core (ULM) is in the On state during PUCCH/PUSCH activities. The UL Manager Core (ULM) is in the Off state if uplink communication is finished or there is no uplink. Each of these tasks is discussed in greater detail below.

The ULM may perform scheduling for uplink activities. The L12CM may wake up the ULM only in the instance when there is an uplink grant. The L12CM delivers to the ULM the configuration as well (for the PUSCH use case). Similarly, the L12CM delivers to the ULM the configuration if a PRACH is scheduled or PUCCH transmission is to occur. The ULM core schedules the tasks for the uplink-dedicated SW modules, and the scheduled software modules configure/control the Uplink Hardware components. As soon as the transport block is transmitted, the ULM then switches off all the resources lying in its domain.

The memory managed by the ULM includes uplink processing memory and the UL-MAC-FIFO (Uplink Media Access Control FIFO). The hardware components managed by the ULM include the PUCCH data path, the PUSCH data path, and the PRACH data path. Alternatively, in some embodiments the ULM may control/execute only the PUSCH channel, and the PUCCH and PRACH processing could be moved to the L12CM core. The architecture described herein is thus very flat, where most or all of the signal processing of the inner receiver and the PHY control channels are concentrated in the L12CM core, and the ULM and DLM only operate with the physical (PHY) data channels. This is especially useful in the case where DL activity occurs with only an ACK/NACK being received in the UL. In that case only 2 cores need to be awakened.

When transmitting uplink, the ULM and all of its domain is powered on for less than one slot. The system may consume approximately 40% of the power of a traditional prior art architecture where the uplink operates until the end of the TTI (Transmit Time Interval). When there is no uplink to be scheduled, the ULM and all its domain is powered off. This results in 0% power consumption, as compared to a prior art architecture that allows the uplink domain to run until the end of the TTI and thus unnecessarily consumes power during this time.

DL Manager Core (DLM) Domain (PDSCH Manager Core)

The Downlink Manager Core (DLM) (or PDSCH Manager Core) performs various tasks such as: scheduling for downlink activities; controlling/configuring the downlink physical channel—PDSCH; controlling/configuring the downlink dedicated data path; managing PDSCH-HW-Subsystem resources and power gating; and managing the MAC downlink buffer. The PDSCH Manager Core (DLM) has two states, these being On and Off. The PDSCH Manager Core (DLM) is in the On state during PDSCH activities, and is in the Off state if PDSCH processing is being performed or there is no PDSCH.

The DL Manager Core performs scheduling for PDSCH activities. The L12CM may wake up the DLM only in the instance when there is a scheduling assignment. The L12CM also delivers to the DLM the configuration to be used for the DL communication. The DL Manager Core schedules the tasks for the PDSCH-dedicated SW modules, and the scheduled modules configure/control the DL hardware components. When the transport block is received on the downlink, the DLM inserts the block into the DL-MAC-FIFO. After receiving the transport block on the downlink and inserting the block into the DL-MAC-FIFO, the DLM then switches off all the resources lying in its domain.

The memory managed by the DLM includes the PDSCH processing memory, the HARQ buffer, and the DL-MAC-FIFO. The hardware components managed by the DLM include the LLR buffer, rate matching logic, and turbo decoder logic, among others.

When receiving data on the PDSCH, the DLM and all of its domain is powered on for one slot. The system may consume 50% of the power of a prior art architecture that allows the PDSCH domain to operate until the end of the TTI. When the PDSCH is not scheduled to be received, the DLM and all its domain are powered off. This results in 0% power consumption, as compared to a prior art architecture which allows the PDSCH-domain to operate until the end of the TTI and thus unnecessarily consumes power during this time.

Figure 9:
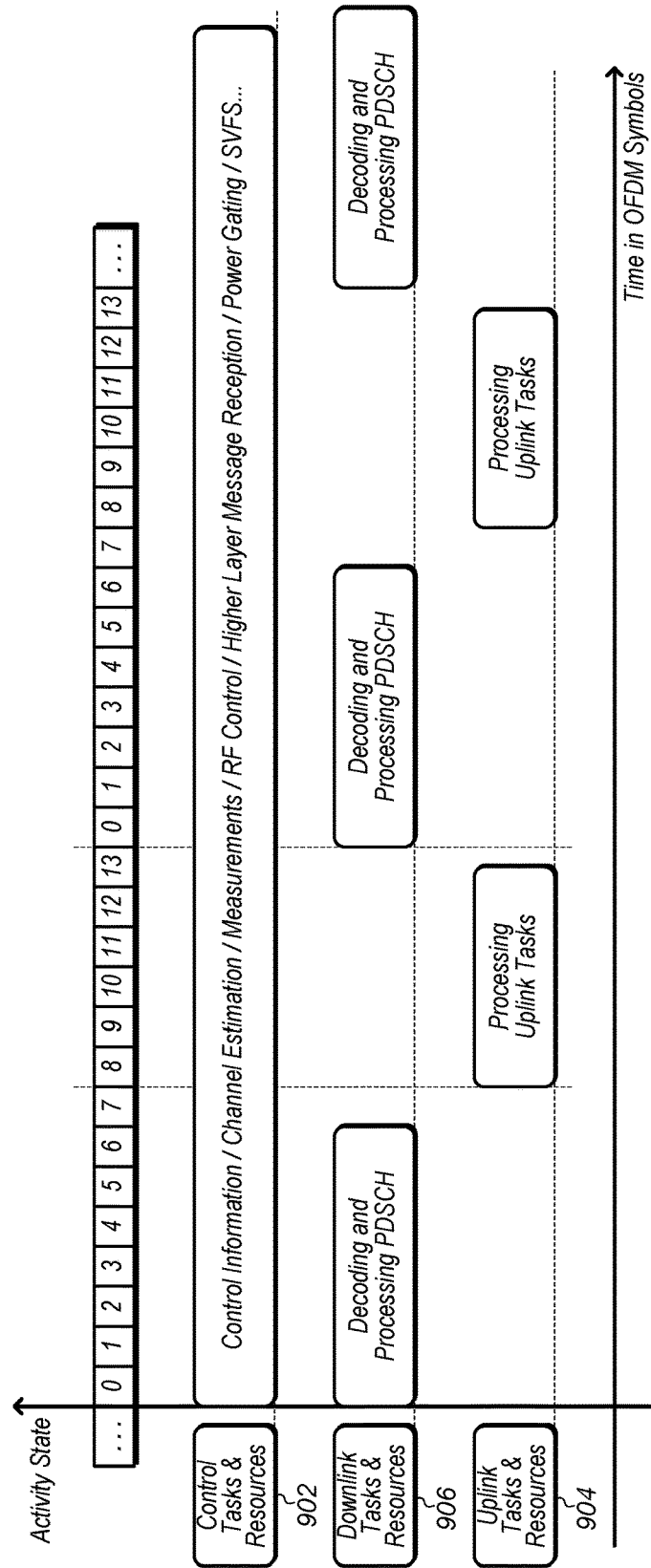
FIG. 9 illustrates the utilization of control, downlink and uplink resources according to the system architecture of FIG. 7, according to some embodiments.

FIG. 9—Cellular Modem Low Power Architecture Use Case

FIG. 9 illustrates a timeline that shows a use case for the low power cellular modem architecture, where both the uplink (UL) and downlink (DL) are active, according to some embodiments. This is an excerpt of a general use case where data is transmitted and received, such as in a VoLTE call, utilizing x Mbps downlink and y Mbps uplink at the same time.

As shown, the L12CM domain (Control Tasks and Resources) 902 is active to receive the control information and deliver them to both the DLM and ULM. The L12CM domain 902 performs all the tasks related to signal processing of the inner receiver and to the common transmit/receive portion.

As shown, the L12CM wakes the DLM (Downlink Tasks and Resources) 906 up directly prior to OFDM symbol 0 to process the PDSCH. The DLM 906 then spends 7 OFDM symbols (symbol 0 to symbol 6) processing the PDSCH. In OFDM symbol number 6, the DLM 906 switches off its domain and goes in sleep mode.

As shown, at OFDM symbol 0 the ULM 904 switches off its domain and enters sleep mode. The L12CM 902 wakes the ULM 904 at OFDM symbol 8, which is 6 slots before the transmission of the uplink.

Referring again to FIG. 6, the wasted resources are delineated with boxes having dashed lines. The prior art architecture in FIG. 5 cannot switch off resources because of the various software complexities involved, including the software layering, sharing of hardware resources, and the RTOS.

Figure 10:
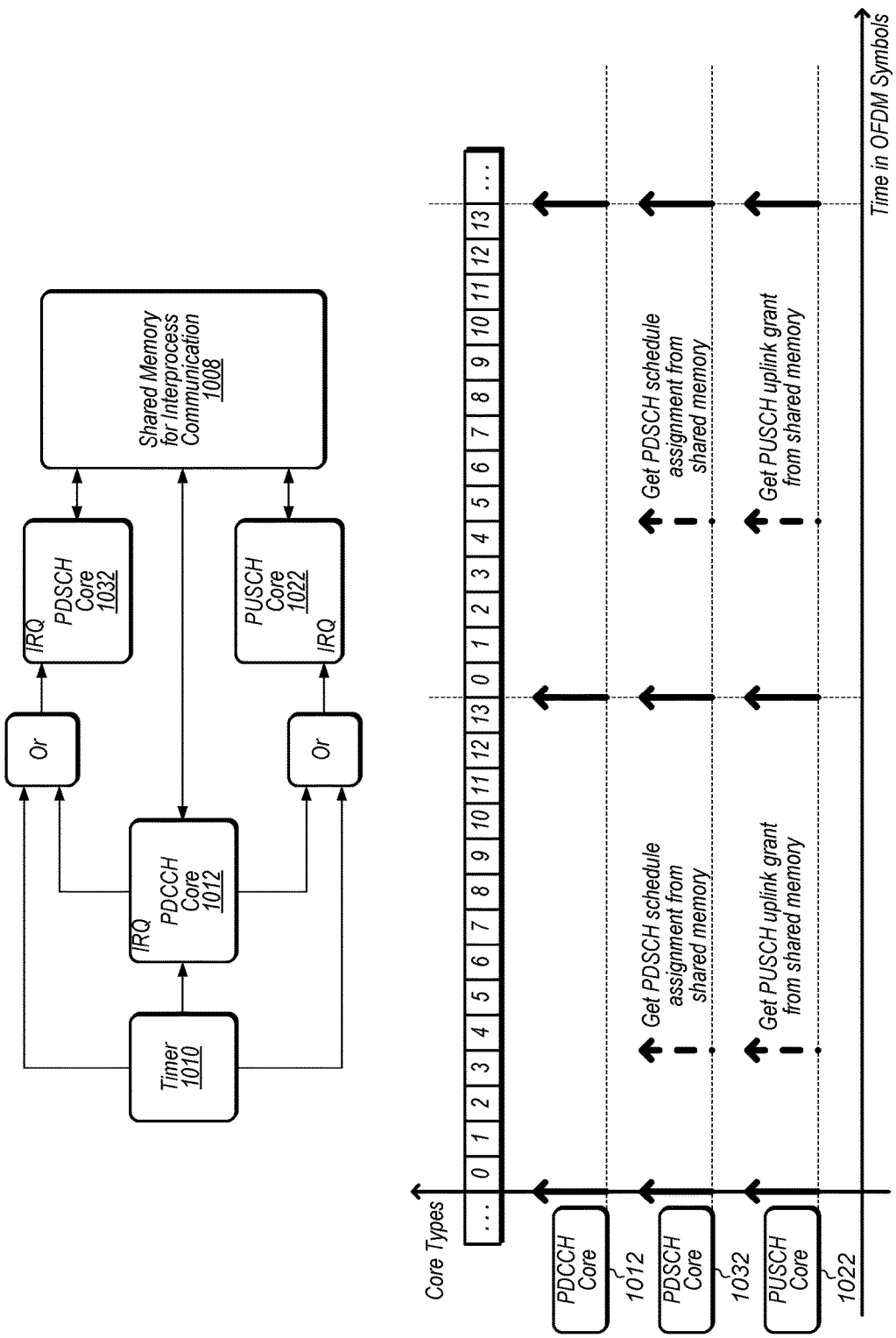
FIG. 10 illustrates an example of a possible interprocess synchronization and communication scheme, according to some embodiments.

FIG. 10—Interprocess Synchronization and Communication Scheme

As previously noted, synchronization between a wireless device and a base station with respect to the air interface on which they communicate may be important in cellular communication systems. As one example, in LTE, the UE is synchronized to the eNodeB to be able to receive and transmit. According to various systems the transmit and receive operations may occur at the same or overlapping times (e.g., in FDD systems) or in predefined slots (e.g., in TDD systems).

Thus, while the separation of uplink, downlink, and control operations such as may be effected using the cellular modem architecture of FIG. 8 or a similar cellular modem architecture may provide opportunities for improving power usage efficiency, among various other possible benefits, such separation may also complicate synchronization and communication considerations between the modules.

One aspect of synchronization between modules concerns the feedback information between the downlink and the uplink used for error detection and correction, HARQ feedback. In order to support this, there must be a way to synchronize the data transfer between DL and UL before the next opportunity for transmitting/receiving.

In an architecture in which control, downlink, and uplink functionality is split among different modules, dynamic configuration of the resources in both UL and DL may represent another important aspect of intermodule communication and synchronization. For example, in LTE, at the start of every 1 ms (e.g., for approximately 200 microseconds), a wireless device may receive in the DL its scheduling assignment and UL grant assignment. The core that decodes the control information must provide the configuration information to the cores that will use that configuration information so that they can appropriately apply it.

Furthermore, recall that it may be desirable that in such a low power architecture, each of the UL and DL (e.g., including all their infrastructure components such as memories, busses, HW, etc) are switched off when not in use. Accordingly, it may be important to provide a mechanism to wake the corresponding core up at the correct timing (e.g., taking all associated actions into consideration) so that it can perform its actions synchronously with the eNodeB, as cores may typically lose their synchronization when switched off.

FIG. 10 illustrates one possible interprocess synchronization and communication scheme that may be used in conjunction with a cellular (e.g., LTE) modem architecture of a wireless device that includes separate control 1012, uplink 1022, and downlink 1032 modules, according to some embodiments.

According to the scheme of FIG. 10, after initial synchronization with the eNodeB, a timer 1010 may be programmed to raise an interrupt at the start of every TTI for all 3 cores 1012, 1022, 1032. These interrupts are illustrated as the solid arrows shown at TTI boundaries in FIG. 10. Each core may then begin processing any tasks to be executed in synchronization with the eNodeB. If there are no synchronous tasks for a core, that core may operate in an idle state with all of its resources, e.g., wasting those resources.

Once the PDCCH has been decoded (e.g., after approximately 3.5-4 OFDM symbols, as one possibility), the control module 1012 may save any configuration information for the wireless device in a shared memory provided for interprocess communication, may raise an interrupt for the PDSCH core 1032, and may also raise an interrupt for the PUSCH core 1022, indicating to each them that DL or UL configurations respectively are available. These interrupts are illustrated as the dashed arrows shown at approximately OFDM symbol 4 in FIG. 10.

The PDSCH core 1032 may retrieve the configuration information out of the memory and start using this configuration at the next timer interrupt (e.g., at the solid arrow between subframes). The PDSCH core 1032 with all its resources may accordingly wait idly without any tasks for the approximately 8 OFDM symbols between the interrupt raised by the control module and the configured downlink activity.

The PUSCH core 1022 may also retrieve the configuration information out of the memory, and may start using it for preparing to transmit on the PUSCH 1022, which may occur at the next timer interrupt). The PUSCH core 1022 with all its resources may accordingly also wait idle without any tasks for approximately 8 OFDM symbols (e.g., 4 before the dashed arrow and 4 before the solid arrow).

Interrupts generally consume resources; for example, every interrupt handling may lead to a context switch, which may cost the system from 10 to 20 clock cycles (or more, e.g., if there are multiple threads in a RTOS). In the scheme of FIG. 10, timer interrupts are raised for all cores at a fixed point in time: at the start of each TTI. This leads to wasting resources when there is nothing to do during this interrupt or the task to do is late in time (not synchronized with the interrupt).

In the illustrated scheme, interprocessor communication is performed by using shared memory 1008. The PDCCH core 1012 stores the configuration into the shared memory 1008 for both cores, then it raises two different interrupts to notify the cores 1022, 1032 so they can fetch their configuration. As a result, the PDSCH core 1032 and PUSCH core 1022 start using their configuration data even if the appropriate time instant to start processing is later in time. This time difference between when the interrupt is raised and the when the core must process this data may represent a waste of resources. Additionally, in the illustrated scheme the PDCCH core 1012 must always raise two interrupts, whether there is configuration or not. If there is no configuration for one (or both) of the PDSCH core 1032 or PUSCH core 1022, the corresponding core will remain active with no tasks to perform, which may also represent a waste of resources.

A further issue with the illustrated scheme may be that the communication is unidirectional: the PDCCH core 1012 may be able to send, through the shared memory 1008, information to the two other cores, but the other two cores may not be able to confirm receiving that information.

Furthermore, race conditions can occur with the illustrated scheme, e.g., if the interrupts of the PDCCH core 1012 are raised late enough (because of the PDCCH processing) that they race with the timer interrupt.

Thus, as can be seen, such a scheme may use a lot of system resources, including interrupts, hardware timers, etc., and may not obtain the maximum benefit of a cellular modem architecture with separate control, downlink, and uplink modules, as the downlink and uplink modules may remain active even during times when there are no activities for them to perform.

Figure 11:
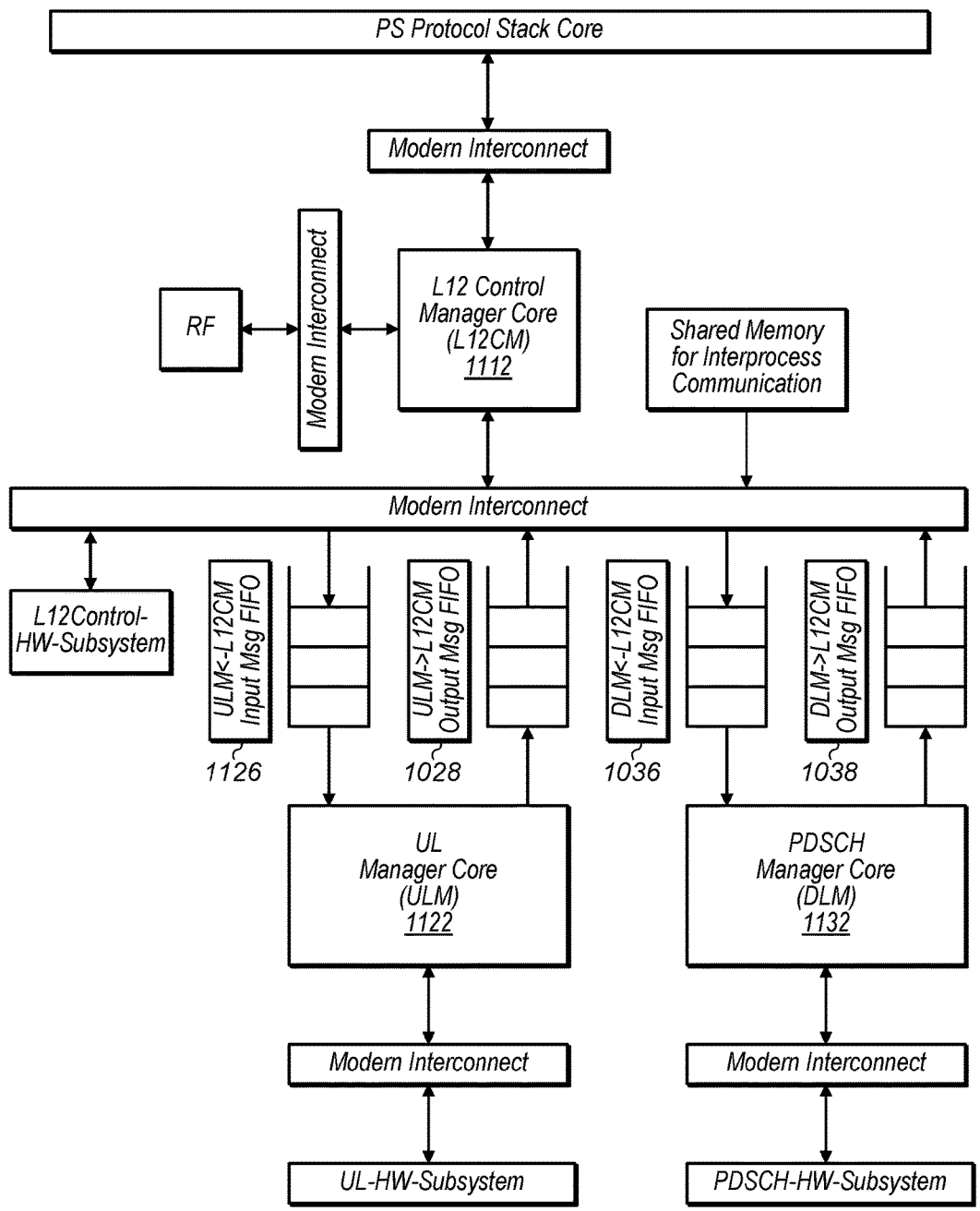
FIG. 11 is a more detailed block diagram illustrating an improved system architecture for the low power wireless device, according to some embodiments.
Figure 12:
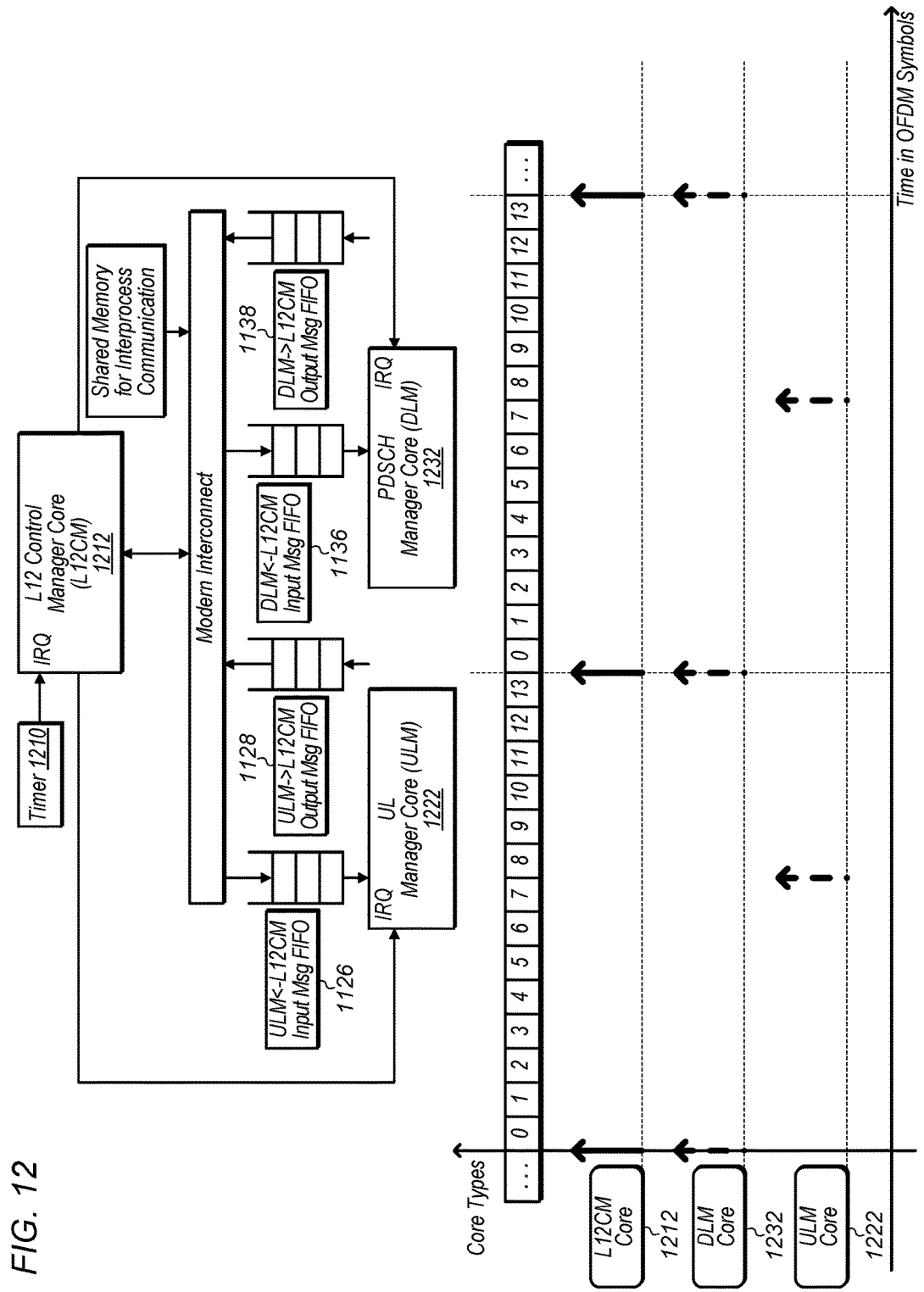
FIG. 12 illustrates another example of a possible interprocess synchronization and communication scheme, according to some embodiments.

FIGS. 11-12—Low Power Cellular Modem Architecture and Interprocess Synchronization and Communication Scheme FIG. 11 illustrates an alternate block diagram of the cellular modem architecture of FIGS. 7-8, according to some embodiments. As previously described, three cores (L12 Control Manager core 1112, ULM core 1122, and DLM core 1132) perform jointly all the control/configuration and post-signal processing for LTE-PHY. Every core controls one domain. The domains are disjoint in their activities and tasks. The L12CM domain is designated for common activities in LTE, preparing for UL/DL, performing (post-)signal processing and communicating with the higher layers. The DLM domain is used for PDSCH physical channel reception. The ULM domain is used for serving LTE-uplink.

The ULM and DLM domains can be switched off when they have nothing to do. All 3 domains are synchronized to LTE-air-interface, and Data/Control Information are routed synchronously among all 3 domains.

FIG. 11 illustrates in greater detail the various FIFOs used to connect the ULM and the DLM to other parts of the system, according to some embodiments. As shown, the UL Manager Core 1122 couples to the L12 Control Manager Core 1112 via two FIFOs, these being a ULM-L12CM input FIFO 1126 and a ULM-L12CM output FIFO 1128. Also, the DL Manager Core 1132 couples to the L12 Control Manager Core 1112 via two FIFOs, these being a DLM-L12CM input FIFO 1136 and a DLM-L12CM output FIFO 1138.

Thus, the domains may communicate with each through FIFO buffers. The buffers may be blocking FIFOs. As one possibility, all FIFOs have the depth of 2; other depths may also be used if desired. The FIFOs may be interrupt free; in other words, interrupts may not automatically be raised when inserting or fetching data from the FIFOs.

According to some embodiments, no FIFOs may be provided between the ULM 1122 and the DLM 1132. In such a case there may be no direct communication between them, and any such information may always be routed through the L12CM 1112. Alternatively, FIFOs may be provided between the ULM 1122 and the DLM 1132 to provide for direct communication if desired.

FIG. 12 illustrates a possible interprocess synchronization and communication scheme that may be used in conjunction with a cellular (e.g., LTE) modem architecture of a wireless device that includes separate control, uplink, and downlink modules, in which communication between the modules is performed by way of FIFOs such as illustrated in and described with respect to FIG. 11, according to some embodiments. Such a scheme may reduce the number of interrupts and provide other benefits relative to the interprocess synchronization and communication scheme of FIG. 10, according to some embodiments.

According to the scheme of FIG. 12, an interrupt may be raised by a timer 1210 just for the L12CM core 1212 every 1 ms, at the TTI boundary, e.g., in order that the L12CM core 1212 remain synchronized with the eNodeB. The L12CM core 1212 may decode the PDCCH and determine if there is a downlink assignment and/or an uplink grant for the wireless device. Once the L12CM core 1212 is finished decoding the PDCCH, it may insert the downlink assignment (if there is one) into the L12CM→DLM FIFO 1236. Similarly, the L12CM core 1212 may insert the uplink grant configuration (if it exists) into the L12CM→ULM FIFO 1226. Note that as the FIFOs may not be mailboxes in the sense of raising an interrupt (notification) when an item is inserted, neither the ULM 1122 nor the DLM 1232 may react or be aware that the L12CM 1212 has inserted this information into their respective FIFOs.

Instead, the L12CM 1212 may raise (e.g., may schedule by programming a timer) an interrupt at the start of the TTI at which the DLM core 1232 is to process the PDSCH if it is required (if there is downlink assignment). The DLM 1232 may fetch the configuration from the L12CM→DLM 1236, and the DLM may insert a confirmation into DLM→L12CM 1238 to indicate that it has retrieved the configuration from the FIFO. Note additionally that if the DLM 1232 would like to send any feedback to the L12CM 1212 or the ULM 1222, it may write this information into the DLM→L12CM FIFO 1238. When the L12CM 1212 empties the DLM→L12CM FIFO 1238, it may route the message to the ULM 1222 or it may keep the information for itself, e.g., depending on the message ID. The DLM core 1232 (e.g., with all of the components of its domain) may enter sleep mode as soon as it is done with PDSCH processing.

Similarly, the L12CM 1212 may raise (e.g., may schedule by programming a timer) an interrupt at the OFDM symbol number (e.g., OFDM symbol 8, as shown, as one possibility) for the ULM core 1222 to prepare for the uplink if it is required (if there is an uplink grant). The ULM 1222 may fetch the configuration from the L12CM→ULM 1226, and the ULM may insert a confirmation into ULM→L12CM 1228 to indicate that it has retrieved the configuration from the FIFO. Note additionally that if the ULM 1222 would like to send any feedback to the L12CM 1212 or the DLM 1232, it may write this information into the ULM→L12CM 1228. When the L12CM 1212 empties the ULM→L12CM 1228, it may route the message to the DLM 1232 or it may keep the information for itself, e.g., depending on the message ID. The ULM core 1222 (e.g., with all of the components of its domain) may enter sleep mode as soon as it is done with the uplink preparation.

Thus, in the scheme of FIG. 12, no interrupts may be required to insert or fetch messages for any processor intercommunication. This may have three implications. A first implication may be that no race conditions will occur in the case of data transfer among the 3 cores. A second implication may be that approximately 20-40 clock cycles may be saved per millisecond by raising fewer interrupts. A third implication may be that the control, uplink, and downlink software may be more simple and predictable, as avoiding interrupts for inserting/fetching messages may allow for a more sequential flow of events.

As previously noted, since the L12CM core 1212 may receive an interrupt every 1 ms (e.g., each TTI), the whole system may be synchronized with eNodeB, with all of the timing information about LTE localized in the L12CM. This may simplify scheduling of all LTE activities, as there may be no conflict from other cores since they have no internal knowledge about LTE-air interface timing. Interrupts may be provided if and when needed to accomplish tasks according to the control information received in the PDCCH, and if the PDCCH contains no assignment, the DLM 1232 and the ULM 1222 with their respective domains may stay in sleep mode (no interrupts are raised by L12CM 1212) and the L12CM 1212 may go into low power mode for the rest of the TTI.

Thus, this architecture allows for a tree-like intermodule communication and synchronization scheme, with the L12CM 1212 as the root (it having the eNodeB timing information), and the DLM 1232 and the ULM 1222 as the leafs of the scheduling components. The L12CM 1212 may not trigger wakeup calls (by raising interrupts) for the DLM 1232/ULM 1222 as long as there is nothing to do for them. This may effectively provide a task oriented, power saving, mechanism for accomplishing cellular communication.

In the following section aspects of the interprocess communication (IPC) and synchronization schemes of FIGS. 10 and 12 are compared.

According to the scheme of FIG. 10, IPC communication channels may include a shared memory without communication direction and without protection. In comparison, according to the scheme of FIG. 12, blocking FIFOs with protection and with communication direction (which core sends to whom) may be used. Additionally, note that at least in some instances the FIFOs may be implemented in HW, which may be fast and avoid any software housekeeping requirements.

According to the scheme of FIG. 10, IPC confirmations may not be possible, as there may be no feedback loops between the sender and receiver. In comparison, according to the scheme of FIG. 12, there is a feedback loop between the sender and the receiver through upward block FIFOs. This may be beneficial to the system, as handshaking may help in predicting bugs and in exception handling.

According to the scheme of FIG. 10, 3 timer interrupts are raised (i.e., one for each core) at the start of each TTI, and additionally 2 interrupts are raised by the L12CM. In comparison, according to the scheme of FIG. 12, 1 timer interrupt is raised for L12CM at the start of each TTI, and up to 2 interrupts are raised by the L12CM, only if needed. As a result, only the L12CM may know about timing, which (in addition to there being fewer interrupts overall) may allow for less complex software.

According to the scheme of FIG. 10, the DLM and ULM resources may be active during the entire TTI. Unused interrupts may be raised, leading to wasted clock cycles. Additionally, the shared memory used for IPC cannot be power gated. In comparison, according to the scheme of FIG. 12, the DLM and ULM resources may be active during approximately half of the TTI. Interrupts may be raised only when required, avoiding wasted clock cycles. Additionally, the FIFOs used for IPC can be power gated when not used. As a result, substantial power savings (e.g., 50% power saving, according to some embodiments, though other values are also possible) may be achieved in both PDSCH and uplink processing.

FIG. 13—Flowchart

Figure 13:
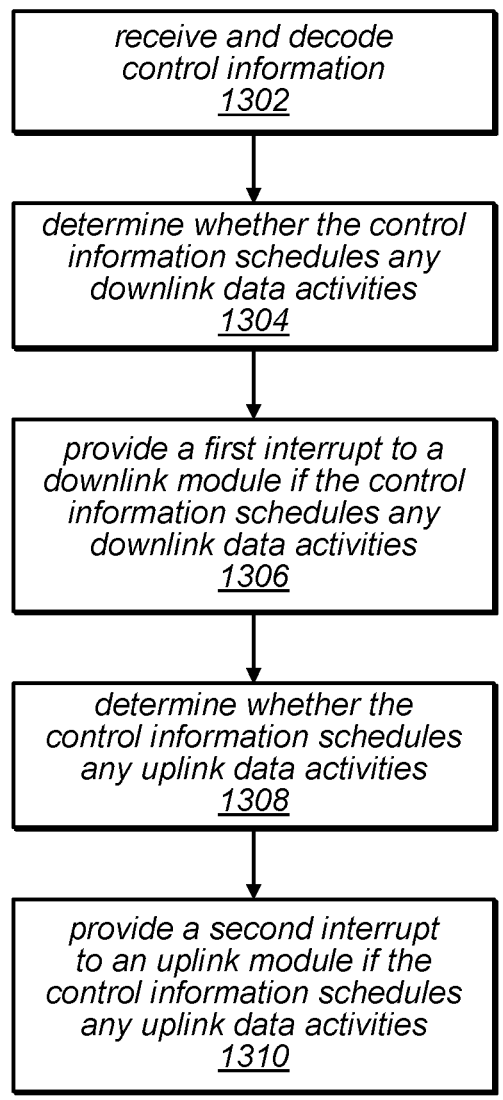
FIG. 13 is a flowchart diagram illustrating an exemplary method for interprocess synchronization and communication, according to some embodiments.

FIG. 13 is a flowchart diagram illustrating a method for performing interprocessor communication and synchronization in a cellular modem having distinct control, uplink, and downlink modules, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as a UE 106 or 107 illustrated in and described with respect to FIGS. 1-3, or more generally in conjunction with any of the computer systems or devices shown in the above Figures, among other devices, as desired. As shown, the method may operate as follows.

In 1302, a control module may receive and decode control information. The control information may be received from a cellular base station on a physical downlink control channel (PDCCH) according to LTE, as one possibility. The control information may include downlink assignment information and/or uplink grant information. The control information may be received within the first portion (e.g., the first ~200 ms) of a subframe, in some embodiments.

Note that to maintain network synchronization of the control module, an interrupt may be raised (e.g., according to a timer) for the control module at the beginning of the subframe in which the control module receives and decodes the control information.

In 1304, the control module may determine whether the control information schedules any downlink data activities for the wireless device. For example, the control information may indicate a downlink assignment for the wireless device, e.g., for the following subframe. Alternatively, the control information may not schedule any downlink data activities for the wireless device, for example if there is no network data to be provided to the wireless device in that particular subframe.

If any downlink data activities are scheduled, the control module may store the downlink assignment information for the scheduled downlink data activities in a buffer designated for providing data from the control module to the downlink module. According to some embodiments, the buffer may be a blocking first in first out (FIFO) buffer.

In 1306, the control module may provide a first interrupt to a downlink module if/when the control information schedules any downlink data activities. The timing of providing the first interrupt may be aligned with the timing of the scheduled downlink data activities, at least according to some embodiments. For example, if the downlink assignment is for the following subframe, the first interrupt may be provided at the start of that subframe. Based on the first interrupt, the downlink module may retrieve the downlink assignment information from the buffer designated for providing data from the control module to the downlink module, and may perform downlink related activities in accordance with the downlink assignment. At least in some embodiments, the downlink module may also store a confirmation that the downlink module has retrieved the downlink assignment information in a buffer (which may also be a blocking FIFO buffer) designated for providing data from the downlink module to the control module, which the control module may subsequently retrieve to confirm that the downlink module has received the downlink assignment.

Note that if the control information does not schedule any downlink data activities, it may be the case that no interrupts are provided to the downlink module for the scheduled subframe, and the downlink module may thus operate in a low power subframe until a subsequent subframe in which some downlink data activity is scheduled.

In 1308, the control module may determine whether the control information schedules any uplink data activities. For example, the control information may indicate an uplink grant for the wireless device, e.g., for the following subframe. Alternatively, the control information may not schedule any uplink data activities for the wireless device, for example if there is no network data to be provided by the wireless device in subframe being scheduled.

If any uplink data activities are scheduled, the control module may store the uplink grant information for the scheduled uplink data activities in a buffer designated for providing data from the control module to the uplink module. According to some embodiments, the buffer may be a blocking first in first out (FIFO) buffer.

In 1310, the control module may provide a second interrupt to an uplink module if the control information schedules any uplink data activities. The timing of providing the second interrupt may be configured in accordance with the timing of the scheduled uplink data activities, at least according to some embodiments. For example, if the uplink grant is for the following subframe, the first interrupt may be provided prior to the start of that subframe to allow the uplink module to prepare for the uplink activity. Based on the second interrupt, the uplink module may retrieve the uplink grant information from the buffer designated for providing data from the control module to the uplink module, and may perform uplink related activities in accordance with the uplink grant. At least in some embodiments, the uplink module may also store a confirmation that the uplink module has retrieved the uplink grant information in a buffer (which may also be a blocking FIFO buffer) designated for providing data from the uplink module to the control module, which the control module may subsequently retrieve to confirm that the uplink module has received the uplink grant.

Note that if the control information does not schedule any uplink data activities, it may be the case that no interrupts are provided to the uplink module for the scheduled subframe, and the uplink module may thus operate in a low power subframe until a subsequent subframe in which some subsequent uplink data activity is scheduled.

Note that the method of FIG. 13 may be repeated as desired. For example, the wireless device may repeat the method of FIG. 13 during each subframe that the wireless device is attached to a cellular network, in order to perform its downlink and uplink data communications with the cellular network.

In the following further exemplary embodiments are provided.

One set of embodiments may include a method for operating a wireless device, comprising: by a control module, comprising a processor core and hardware subsystem configured to handle control communications according to a wireless communication technology: receiving and decoding control information during a first subframe; determining whether the control information schedules downlink data activity for the wireless device; providing, if the control information schedules downlink data activity for the wireless device, a first interrupt to a downlink module for the scheduled data activity, wherein the downlink module comprises a processor core and hardware subsystem configured to handle downlink data communications according to the wireless communication technology; determining whether the control information schedules uplink data activity for the wireless device; and providing, if the control information schedules uplink data activity for the wireless device, a second interrupt to an uplink module for the scheduled uplink data activity, wherein the uplink module comprises a processor core and hardware subsystem configured to handle uplink data communications according to the wireless communication technology.

According to some embodiments, the control information schedules downlink data activities for the wireless device for a second subframe immediately subsequent to the first subframe, wherein the first interrupt is provided at a start of the second subframe.

According to some embodiments, the control information schedules uplink data activity for the wireless device for a second subframe immediately subsequent to the first subframe, wherein the first interrupt is provided prior to a start of the second subframe.

According to some embodiments, the control module does not schedule any interrupts for the downlink module or the uplink module respectively if the control information does not schedule any downlink data activities or uplink data activities respectively, the downlink module operates in a low power state until a subsequent interrupt is provided to the downlink module if the control information does not schedule any downlink data activities for the wireless device, and the uplink module operates in a low power state until a subsequent interrupt is provided to the uplink module if the control information does not schedule any uplink data activities for the wireless device.

According to some embodiments, the method further includes, by the control module: storing downlink assignment information for the second subframe in a buffer configured for providing data from the control module to the downlink module if downlink data activities are scheduled for the second subframe.

According to some embodiments, the method further includes, by the downlink module: retrieving the downlink assignment information for the second subframe from the buffer configured for providing data from the control module to the downlink module based on receiving the first interrupt from the control module; and storing a confirmation that the downlink module has retrieved the downlink assignment information for the second subframe in a buffer configured for providing data from the downlink module to the control module.

According to some embodiments, the method further includes, by the control module: storing uplink grant information for the second subframe in a buffer configured for providing data from the control module to the uplink module if uplink data activities are scheduled for the second subframe.

According to some embodiments, the method further includes, by the uplink module: retrieving the uplink grant information for the second subframe from the buffer configured for providing data from the control module to the uplink module based on receiving the second interrupt from the control module; and storing a confirmation that the uplink module has retrieved the uplink grant information for the second subframe in a buffer configured for providing data from the uplink module to the control module.

According to some embodiments, the buffers are blocking first in first out (FIFO) buffers.

According to some embodiments, the method further includes, by the control module: receiving an interrupt at a start of the first subframe synchronizing the control module with a base station that is serving the wireless device according to the wireless communication technology.

Another set of embodiments may include a wireless device, including: a radio; a control module comprising a processor core and hardware subsystem configured to handle control communications according to a wireless communication technology; a downlink module comprising a processor core and hardware subsystem configured to handle downlink data communications according to the wireless communication technology; and an uplink module comprising a processor core and hardware subsystem configured to handle uplink data communications according to the wireless communication technology; wherein the radio, the control module, the downlink module, and the uplink module are communicatively coupled, wherein the wireless device is configured to implement a method according to any of the preceding examples.

A further set of embodiments may include an integrated circuit, including a control module, a downlink module, and an uplink module, wherein the integrated circuit is configured to implement a method according to any of the preceding examples.

Yet another set of embodiments may include a computer accessible memory medium, comprising program instructions that, when executed, cause a wireless device to implement a method according to any of the preceding examples.

Still another set of embodiments may include a computer program comprising instructions for performing a method according to any of the preceding examples.

A still further set of embodiments may include an apparatus comprising means for performing a method according to any of the preceding examples.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus configured to provide a cellular communication control module of a wireless device, wherein the apparatus comprises a processing element configured to cause the wireless device to:
    receive control information during a first subframe;
    determine whether the control information schedules downlink data activity for the wireless device;
    provide, when the control information schedules downlink data activity for the wireless device, a first interrupt to a cellular communication downlink module of the wireless device for the scheduled data activity, wherein no interrupt is provided to the cellular communication downlink module of the wireless device when the control information does not schedule downlink data activity for the wireless device, wherein the downlink module is configured to operate in a low power state until a subsequent interrupt is provided to the downlink module when the control information does not schedule any downlink data activity for the wireless device;
    determine whether the control information schedules uplink data activity for the wireless device; and
    provide, when the control information schedules uplink data activity for the wireless device, a second interrupt to a cellular communication uplink module of the wireless device for the scheduled uplink data activity, wherein no interrupt is provided to the cellular communication uplink module of the wireless device when the control information does not schedule uplink data activity for the wireless device, wherein the uplink module is configured to operate in a low power state until a subsequent interrupt is provided to the uplink module when the control information does not schedule any uplink data activity for the wireless device.

2. The apparatus of claim 1,
    wherein the processing element comprises a processor core and hardware subsystem configured to handle control communications according to a cellular communication technology,
    wherein the cellular communication downlink module comprises a processor core and hardware subsystem configured to handle downlink data communications according to the cellular communication technology,
    wherein the cellular communication uplink module comprises a processor core and hardware subsystem configured to handle uplink data communications according to the cellular communication technology.

3. The apparatus of claim 1, wherein the processing element is further configured to cause the wireless device to:
    store downlink assignment information in a buffer configured for providing data from the control module to the downlink module when the control information schedules downlink data activity for the wireless device.

4. The apparatus of claim 3, wherein the processing element is further configured to:
    retrieve, by the downlink module, the downlink assignment information from the buffer configured for providing data from the control module to the downlink module based on receiving the first interrupt from the control module; and
    store, by the downlink module, a confirmation that the downlink module has retrieved the downlink assignment information in a buffer configured for providing data from the downlink module to the control module.

5. The apparatus of claim 1, wherein the processing element is further configured to cause the wireless device to:
store uplink assignment information in a buffer configured for providing data from the control module to the uplink module when the control information schedules uplink data activity for the wireless device.

6. The apparatus of claim 5, wherein the processing element is further configured to:
retrieve, by the uplink module, the uplink grant information from the buffer configured for providing data from the control module to the uplink module based on receiving the second interrupt from the control module; and
store, by the uplink module, a confirmation that the uplink module has retrieved the uplink grant information in a buffer configured for providing data from the uplink module to the control module.

7. A wireless device, comprising:
radio frequency (RF) circuitry;
a control module comprising a processor core and hardware subsystem configured to handle control communications according to a wireless communication technology;
a downlink module comprising a processor core and hardware subsystem configured to handle downlink data communications according to the wireless communication technology; and
an uplink module comprising a processor core and hardware subsystem configured to handle uplink data communications according to the wireless communication technology;
wherein the RF circuitry, the control module, the downlink module, and the uplink module are communicatively coupled,
wherein the wireless device is configured to:
receive and decode, by the control module, control information during a first subframe;
determine, by the control module, whether the control information schedules downlink data activity for the wireless device;
provide, by the control module, if the control information schedules downlink data activity for the wireless device, a first interrupt to the downlink module for the scheduled data activity;
determine, by the control module, whether the control information schedules uplink data activity for the wireless device; and
provide, by the control module, if the control information schedules uplink data activity for the wireless device, a second interrupt to the uplink module for the scheduled uplink data activity;
wherein the control module does not schedule any interrupts for the downlink module or the uplink module respectively if the control information does not schedule any downlink data activity or uplink data activity respectively;
wherein the downlink module operates in a low power state until a subsequent interrupt is provided to the downlink module if the control information does not schedule any downlink data activity for the wireless device; and
wherein the uplink module operates in a low power state until a subsequent interrupt is provided to the uplink module if the control information does not schedule any uplink data activity for the wireless device.

8. The wireless device of claim 7,
wherein the control information schedules downlink data activity for the wireless device for a second subframe immediately subsequent to the first subframe, wherein the first interrupt is provided at a start of the second subframe.

9. The wireless device of claim 7,
wherein the control information schedules uplink data activity for the wireless device for a second subframe immediately subsequent to the first subframe, wherein the second interrupt is provided prior to a start of the second subframe.

10. The wireless device of claim 7, wherein the wireless device is further configured to:
store, by the control module, downlink assignment information in a buffer configured for providing data from the control module to the downlink module if the control information schedules downlink data activity for the wireless device.

11. The wireless device of claim 10, wherein the wireless device is further configured to:
retrieve, by the downlink module, the downlink assignment information from the buffer configured for providing data from the control module to the downlink module based on receiving the first interrupt from the control module; and
store, by the downlink module, a confirmation that the downlink module has retrieved the downlink assignment information in a buffer configured for providing data from the downlink module to the control module.

12. The wireless device of claim 7, wherein the wireless device is further configured to:
store, by the control module, uplink grant information in a buffer configured for providing data from the control module to the uplink module if the control information schedules uplink data activity for the wireless device.

13. The wireless device of claim 12, wherein the wireless device is further configured to:
retrieve, by the uplink module, the uplink grant information from the buffer configured for providing data from the control module to the uplink module based on receiving the second interrupt from the control module; and
store, by the uplink module, a confirmation that the uplink module has retrieved the uplink grant information in a buffer configured for providing data from the uplink module to the control module.

14. The wireless device of claim 7, wherein the wireless device further comprises a blocking first in first out (FIFO) buffer for each of:
providing data from the control module to the downlink module;
providing data from the downlink module to the control module;
providing data from the control module to the uplink module; and
providing data from the uplink module to the control module.

15. The wireless device of claim 7, wherein the wireless device is further configured to:
receive, by the control module, an interrupt at a start of the first subframe synchronizing the control module with a base station that is serving the wireless device according to the wireless communication technology.

16. A method, comprising:

by a control module of a wireless device:

establishing a cellular communication link with a cellular base station according to a cellular communication technology;

receiving control information from the cellular base station, wherein the control information indicates if there is downlink data activity scheduled for the wireless device and if there is uplink data activity scheduled for the wireless device, wherein the control information is received by the control module of the wireless device;

providing an interrupt to a downlink module of the wireless device if the control information indicates that there is downlink data activity scheduled for the wireless device, wherein no interrupt is provided to the downlink module of the wireless device if the control information does not indicate that there is downlink data activity scheduled for the wireless device, and wherein the downlink module operates in a low power state until a subsequent interrupt is provided to the downlink module if the control information does not schedule any downlink data activity for the wireless device; and providing an interrupt to an uplink module of the wireless device if the control information indicates that there is uplink data activity scheduled for the wireless device, wherein no interrupt is provided to the uplink module of the wireless device if the control information does not indicate that there is uplink data activity scheduled for the wireless device, and wherein the uplink module operates in a low power state until a subsequent interrupt is provided to the uplink module if the control information does not schedule any uplink data activity for the wireless device.

17. The method of claim 16, further comprising:

providing downlink assignment information from the control module to the downlink module using a first-in-first-out (FIFO) blocking buffer configured for providing data from the control module to the downlink module if the control information schedules downlink data activity for the wireless device.

18. The method of claim 17, further comprising:

retrieving a confirmation that the downlink module has retrieved the downlink assignment information from a FIFO blocking buffer configured for providing data from the downlink module to the control module.

19. The method of claim 16, further comprising:

providing uplink grant information from the control module to the uplink module using a first-in-first-out (FIFO) blocking buffer configured for providing data from the control module to the uplink module if the control information schedules uplink data activity for the wireless device.

20. The method of claim 19, further comprising:

retrieving a confirmation that the uplink module has retrieved the uplink grant information from a FIFO blocking buffer configured for providing data from the uplink module to the control module.

* * * * *